May 22, 1951  G. BRAHS  2,553,698
METHOD OF MAKING FRICTION ELEMENTS
Filed June 17, 1947  2 Sheets-Sheet 1

Inventor
George Brahs
By Alfred W. Vibber
His Attorney

May 22, 1951  G. BRAHS  2,553,698
METHOD OF MAKING FRICTION ELEMENTS
Filed June 17, 1947  2 Sheets-Sheet 2

Inventor
George Brahs
By Alfred W. Vibber
His Attorney

Patented May 22, 1951

2,553,698

UNITED STATES PATENT OFFICE 2,553,698

METHOD OF MAKING FRICTION ELEMENTS

George Brahs, Hawthorne, N. J.

Application June 17, 1947, Serial No. 755,137

7 Claims. (Cl. 154—81)

This invention relates to improved methods of making friction elements such as friction-discs and clutch facings.

The invention has among its objects the provision of an improved method of making an improved friction-disc which is so constructed that the reinforcing elements in its friction face are largely discontinuous, whereby the disc surface has very little if any, tendency to glaze. The friction disc made by the method of the present invention is also characterized by its substantial regularity of structure throughout its mass.

A further object of the invention is the provision of an improved and simplified method for making friction-discs, whereby less pressure is required in the pressing operation, and the amount of labor required for cleaning, repairing, and otherwise maintaining the disc forming molds is greatly reduced.

These and further objects of the invention will be more clearly apparent in the following description of preferred embodiments of the friction-disc, and of the method of making it, in accordance with the invention. In the drawings appended hereto which form a part of such description:

Figure 9:
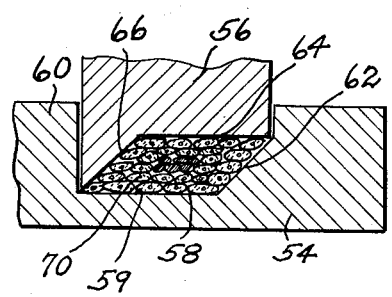
Figure 9 is a view in vertical section through a mold employed in the preliminary pressing of an annular element to be employed in the form of a friction-disc by an alternative method.
Figure 10:
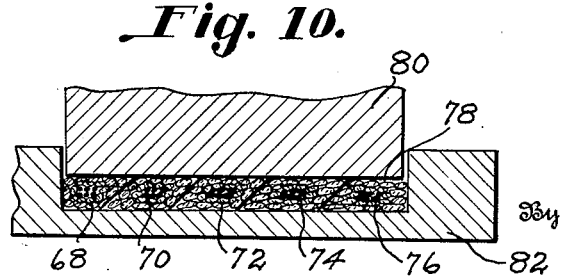
Figure 10 is a view in vertical section of a portion of a second mold, employed in pressing a plurality of annular elements, of which one is shown in Figure 9, together to form a disc.

Referring to the drawings, the various elements going into the making up of a friction-disc in carrying out the preferred method of the invention, as well as the apparatus employed in the performance of such method, are shown in Figures 1 to 8, inclusive. In Figures 9 and 10 there are indicated portions of other apparatus by which the friction-disc may be formed in accordance with an alternative method.

Figure 1:
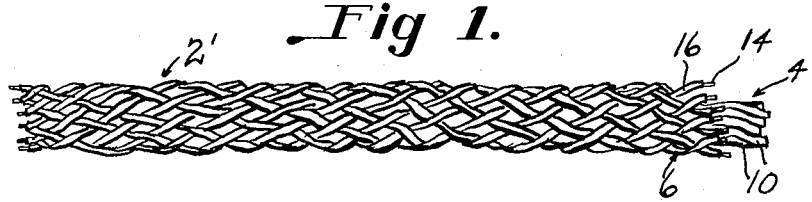
Figure 1 is a view in side elevation of a reinforcing element in the form of a rope-like web.
Figure 2:
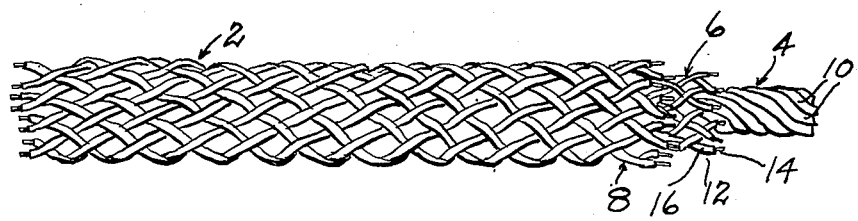
Figure 2 is a similar view of a rope-like web similar to that of Figure 1, but having another braided covering thereon.

In accordance with the invention, there is employed reinforcing material in the body of the disc, such material being in the form of elongated stranded rope-like webs, the lengths of which extend generally in the plane of the disc. Such reinforcing webs may take either of the forms shown in Figure 1 or 2. In Figure 2, the rope-like web, indicated generally by the reference character 2, is composed of a core 4, a first braided covering layer 6 over such core, and a second braided covering layer 8 over layer 6. In Figure 1, the structure of the rope-like web, indicated generally at 2' is the same as that of web 2 but for the omission of the second covering layer 8. The core 4 is preferably formed from a plurality of strands 10 of relatively strong material twisted together. Such strands 4 may be threads of cotton or like textile material, but it is preferred, for the sake of economy, to make them out of strong twisted paper. The individual strands of the two braided covering layers 6 and 8 are made of reinforced asbestos, each such strand, shown at 12 in both Figures 1 and 2, having a central reinforcing wire strand 14 and a covering layer 16 thereover of long fibered asbestos. Although it is preferred to employ as the reinforcement for the friction-disc of the invention the rope-like web 2 shown in Figure 2, having two braided covers thereon, because of the relatively larger volume of voids and larger number of interstices therein, there may be employed, as explained above, the web 2' shown in Figure 1 having a single braided cover thereon. In the illustrations of Figures 3 to 8, inclusive, the web 2 shown in Figure 2 is shown as being used.

Figure 3:
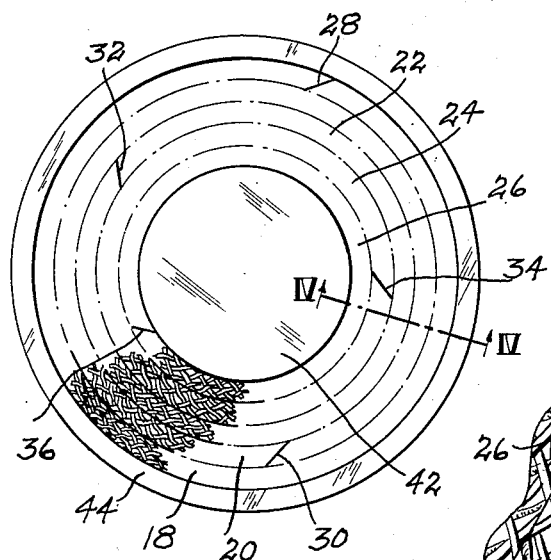
Figure 3 is a view in plan of the female portion of a mold containing a plurality of annuli formed from the web shown in Figure 2.

The rope-like web is cut into appropriate lengths so that each may be made into the form of a one-turn coil, the resulting annuli or rings fitting snugly one within the other. Preferably the webs are cut on a bias, as shown in Figure 3, so that the abutting ends of each of the annuli 18, 20, 22, 24, and 26 overlap each other somewhat, as shown at 28, 30, 32, 34, and 36, respectively. It is most convenient to accomplish the assembly of the annuli in mold space 38 in the female die or mold part 40, shown in Figure 4, in which 42 designates the central core of the mold, and 44 denotes the outer upstanding rim or barrel of the mold. In order to produce as uniform a disc as possible and to add to its strength, the biased joints 28 to 36, inclusive, between the abutting ends of the several annuli are staggered as shown, in approximately uniformly spaced angular relationship.

Figure 4:
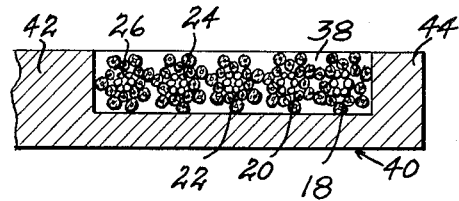
Figure 4 is a view in vertical section through such mold part and its charge, the section being taken along the line IV—IV in Figure 3.
Figure 5:
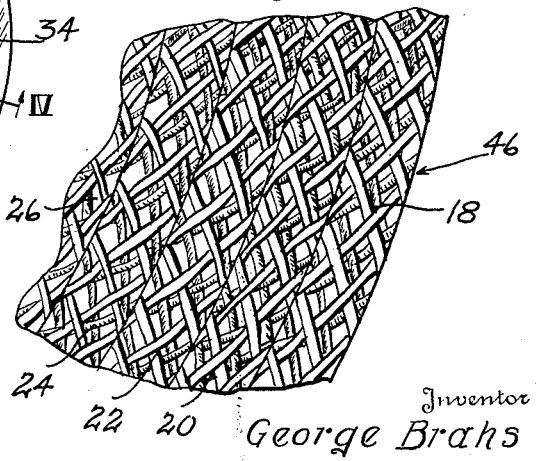
Figure 5 is an enlarged view in plan of a portion of the disc resulting from pressing the annuli in such mold.

The manner in which the annuli 18 to 26, inclusive, occupy the mold space 38 and lie side-by-side when so assembled is most clearly shown in Figure 4, which shows such annuli in the positions they assumed after assembly but before pressing. In Figure 5 is shown the disc resulting from such assembled annuli after they have been pressed by a male mold part, not shown, having an annular portion interfitting with the annular recess 38 in the female mold part 40. Such pressing operation causes the projecting portions on each of the annuli 18 to 26, inclusive, to be pressed into the confronting interstices in adjacent annuli, so that as a result of such pressing operation there results a unitary self-sustaining disc 46, shown in Figure 5, such disc being strong enough to withstand the subsequent processing step. Because the annuli at this stage are unimpregnated and thus soft, only moderate pressures are required in the above pressing operation.

Disc 46 is then impregnated with a bonding and friction treatment material. Such impregnation is most conveniently carried out by immersing disc 46 in a bath of such material, allowing it to remain until the bonding and friction-treatment material has penetrated and filled all or substantially all of the interstices in such structure, and then removing the disc and allowing the bonding and friction-treatment material to drain therefrom. Although it is to be understood that various other known bonding and friction-treatment materials may be employed for such impregnation of the pressed disc, it has been found that the following material, given by way of example only, produces admirable results:

Impregnating composition

| | Percent by weight |
|---|---|
| Thermosetting resin | 40 |
| Alcohol | 60 |

The thermosetting resin may be, by way of example, a phenol-formaldehyde resin, of which that known as Durez 8045 is typical.

The alcohol may be any one of the volatile lower alcohols acting as a solvent for resin. Ordinarily either methyl or ethyl alcohol is preferred for this purpose.

Figure 6:
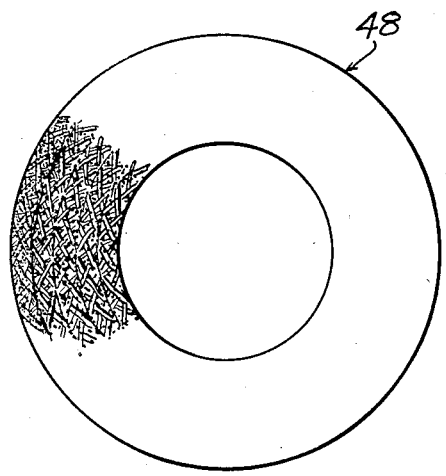
Figure 6 is a view in plan of such pressed disc after impregnation with a bonding and friction-treatment material.
Figure 7:
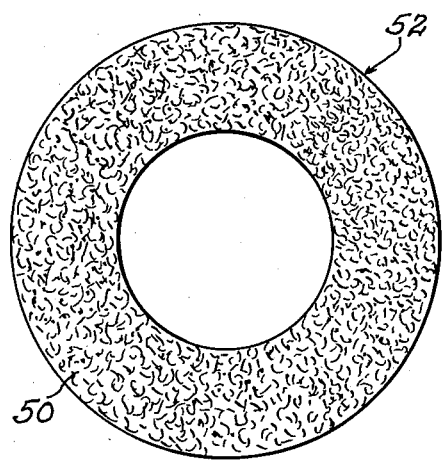
Figure 7 is a view in plan of the disc shown in Figure 6 after it has been coated with a second friction-treatment material.
Figure 8:
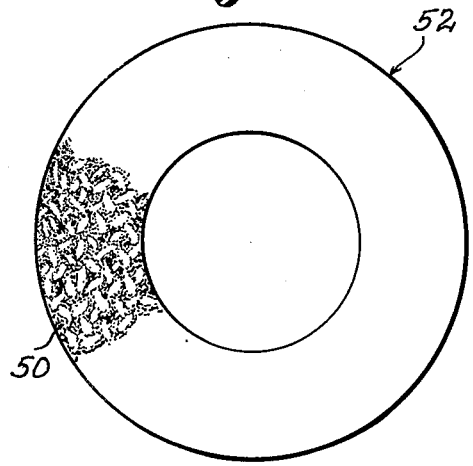
Figure 8 is a view in plan of a finished friction-disc made in accordance with the preferred method of the invention.

The disc resulting from such impregnating step is shown at 48 in Figure 6. After such step of impregnation, and after the volatile solvent in the impregnant has evaporated to some extent, but while the impregnant is still somewhat tacky, there is applied to the disc 48 a further coating, shown at 50 on the disc, there designated 52, illustrated in Figure 7. Such further coating 50 consists largely of short fibered asbestos, mixed with further bonding and friction-treatment material. Coating 50 may be applied to disc 48 by a brushing operation, or by spreading it on with a knife. By way of illustration but not limitation, there is given below a composition for coating 50 which has given very satisfactory results.

Friction treatment coating

| | Percent by weight |
|---|---|
| Short fibered asbestos | 70 |
| Thermosetting resin | 17 |
| Barytes | 5 |
| Hard rubber dust | 5 |
| Black iron oxide ($Fe_3O_4$) | 2 |
| Aluminum stearate | 1 |

The thermosetting resin may be, by way of example, a phenol-formaldehyde resin, of which that known as Durez 8045 is typical.

After the solvent in coating 50 has evaporated so that such coating is thoroughly dry, the resulting coated disc, designated 52, is placed in a mold having a configuration similar to that shown fragmentarily in Figure 4, and is subjected to heat and pressure so as to cure and harden the impregnating bonding and friction treatment material and the material in coating 50, so that there results a very strong, hard, relatively inflexible disc. Such disc is then finished by being surface ground on one or both of its flat faces to produce the finished disc shown in Figure 8. The disc there shown is one which results from the use of the double braided reinforcing rope-like webs shown in Figure 2, in which, by reason of such double braid covering, the volume of the voids or interstices in such web relative to the solid matter in the web is large, and thus there is afforded space for a high percentage by weight of impregnant in disc 48. In the finished ground face of the friction-disc 52, shown in Figure 8, there will appear, on the surface, portions of both the first and second braided covering layers 6 and 8 of the rope-like webs, the interstices between such strands of the webs being filled with the coating 50. The lighter area, in the portion of the disc shown in detail at the left in Figure 8, designates the strands of the braided covering, and the darker areas designate the short-fibered asbestos containing mix of coating 50. Thus, the strands in the braided coverings appear as discontinuous elements in the friction-disc face, the wear on such face being sustained largely by the remaining fragments of coating 50. Because of the discontinuity in such face of both the strands in the braids, and of the short-fibered asbestos mix, the disc face shows little tendency to smear and thus to glaze.

In the alternative method of making the friction-disc, indicated in Figures 9 and 10, individual annuli 68 and 76, inclusive, are formed from a one-turn coil of appropriate diameter made from the rope-like web 2. Each such annulus, the ends of which may be butted on the bias, as in the embodiment shown in Figure 3, is pressed in an annular mold of which a fragment is shown in Figure 9, in which 54 designates the female portion of the mold, and 56 the male part thereof. The recess 58 in mold part 54 has a straight inner shoulder 60, a horizontal inner bottom surface 59, and an upwardly and outwardly inclined outer bottom surface 62. The male part 56 is formed with its bottom surface as shown, the outer portion 64 thereof being horizontal, and the inner portion 66 being inclined inwardly and downwardly parallel to surface 62, so that the space defined between the male and female mold parts is in cross-section a rhomboid.

The resultant annuli or rings so treated, designated 68, 72, 74, and 76, respectively, are assembled, preferably in the recess 78 of a second annular mold of which a fragment is shown in Figure 10, such recess being of annular disc shape. The inclined inner and outer edges of the inner annuli 70, 72, and 74 snugly interfit as shown, so that the upper and bottom faces of such annuli lie in planes. The inner and outer annuli 68 and 76, respectively, are provided with their inner faces inclined to interfit, in a similar manner, with adjacent annuli, but their radially outward and inward faces, respectively, are formed straight in a mold similar to that shown in Figure 9, except for the provision of a mold recess of a shape such as to form such modified shapes.

After the assembled disc has been pressed in the mold shown in Figure 10, in which 80 designates the male and 82 the female part thereof, there is produced a unitary self-sustaining disc quite similar to that shown in Figure 5. Such disc may then be successively treated by the steps of impregnation, partially drying the impregnant, and the further application of a bonding and friction-treatment coating such as coating 50 of the first embodiment. Thereafter, the disc after drying of such coating, treated under heat and pressure to cure the impregnant, and the bonding and friction-treatment materials, and is then ground to produce a finished disc, such as that shown in Figure 8.

Because of the fact that each of the reinforcing annuli formed from the rope-like web is located in a circle coaxial of the disc, and thus its action in use is uniform throughout the area of its friction face. The biasing of the joints between the ends of the annuli, and their being staggered about the disc as described, likewise result in a stronger, more uniform structure. The method of the present invention discloses marked advantages over those heretofore used, since all the pressing operations take place with the disc forming elements and the disc itself in substantially dry condition. In the pressing of the annuli to form the disc, the rope-like webs are unimpregnated and thus, there is no material which can stick to the mold parts or ooze therefrom. The pressing of the disc, after application of the coating 50 thereto, is performed after such coating is thoroughly dry, and thus here again, there is no material such as resin, to stick to the mold parts or to escape therefrom. Thus the cleaning and maintenance of the molds employed in carrying out the method of the invention are nominal, and as a result, the method is characterized by its economy of both labor and material.

Although I have described and illustrated preferred embodiments of the friction-disc of the invention and of the method for making such friction-discs, it is to be understood that the invention is not limited thereto, since it may be varied considerably as to details.

I claim as new the following:

1. The method of forming a generally flat friction element comprising the following steps in the order named: forming a series of similar hollow shapes of one closed turn of rope-like webs composed of a plurality of elongated strands extending generally longitudinal of the web, the shapes being so related in size as to fit in progression one within the other and to lie generally in a plane, assembling such shapes in such recited manner to form a composite shape, compressing the thus assembled composite shape in a direction generally normal to its plane so that there results a unitary self-sustaining body, impregnating such body with a heat hardenable fluid bonding and friction-treatment material, coating the thus impregnated body with a mix comprising a major amount of a comminuted filler and a minor amount of a heat hardenable binder, allowing the thus coated body to dry, and curing the impregnating material and the binder in the coating by subjecting the body to heat while under pressure.

2. The method of forming a generally flat friction element comprising the following steps in the order named: forming a series of similar hollow shapes of one closed turn of rope-like webs composed of a plurality of elongated strands extending generally longitudinal of the web, each having exterior interlaced strands forming interstices and projections, the shapes being so related in size as to fit in progression one snugly within the other and to lie generally in a plane, assembling such shapes in such recited manner to form a composite shape, compressing the thus assembled composite shape in a direction normal to its plane so that there results a unitary self-sustaining body, impregnating such body with a heat hardenable fluid bonding and friction-treatment material, coating the thus impregnated body with a mix comprising a major amount of a comminuted filler and a minor amount of a fluid heat hardenable binder, allowing the thus coated body to dry, and curing the impregnating material and the binder in the coating by subjecting the body to heat while under pressure.

3. The method of forming a friction-disc comprising the following steps in the order named: forming a series of rings of one closed turn of rope-like webs composed of a plurality of elongated strands extending generally longitudinal of the web, each having exterior interlaced strands forming interstices and projections, the rings being so related in size as to fit in progression one snugly within the other and to lie generally in a plane, assembling such shapes in such recited manner to form a composite disc, the abutting ends of successive rings being staggered angularly around the disc, compressing the thus assembled composite disc in a direction normal to its plane so that there results a unitary self-sustaining body, impregnating such body with a heat hardenable fluid bonding and friction-treatment material comprising a synthetic resin, coating the thus impregnated body with a mix comprising a major amount of a comminuted filler and a minor amount of a heat hardenable binder comprising a synthetic resin, allowing the thus coated body to dry, and curing the impregnating material and the binder in the coating by subjecting the body to heat and pressure.

4. The method of forming a flat friction-disc comprising the following steps in the order named: forming a series of rings of one closed turn of rope-like webs composed of a plurality of elongated strands extending generally longitudinal of the web, each having exterior interlaced strands forming interstices and projections, the abutting ends of each ring meeting on a bias, the rings being so related in size as to fit in progression one snugly within the other and to lie generally in a plane, assembling such shapes in such recited manner to form a composite disc, the abutting ends of successive rings being staggered angularly around the disc, compressing the thus assembled composite disc in a direction normal to its plane so that there results a unitary self-sustaining body, impregnating such body with a heat hardenable fluid bonding and friction-treatment material composed largely of a synthetic resin, coatings the thus impregnated body with a mix comprising a major amount of short-fibered asbestos and a minor amount of a fluid heat hardenable binder comprising a synthetic resin, allowing the thus coated body to dry, and curing the impregnating material and the binder in the coating by subjecting the body to heat and pressure.

5. The method of forming a generally flat friction element comprising the following steps in the order named: forming a series of similar hollow shapes of one closed turn of rope-like webs composed of a plurality of elongated strands extending generally longitudinal of the web, each having exterior interlaced strands forming interstices and projections, pressing each such shape individually to compress it in a direction normal to its plane, the resulting shapes being so related in size as to fit snugly in progression one within the other, assembling such shapes in such recited manner to form a composite shape, compressing the thus assembled composite shape in a direction normal to its plane so that there results a unitary self-sustaining body, impregnating such body with a heat hardenable fluid bonding and friction-treatment material, coating the thus impregnated body with a mix comprising a major amount of a comminuted filler and a minor amount of a heat hardenable binder, allowing the thus coated body to dry, and curing the impregnating material and the binder in the coating by subjecting the body to heat while under pressure.

6. The method of forming a flat friction-disc comprising the following steps in the order named: forming a series of rings of one closed turn of rope-like webs composed of a plurality of elongated strands extending generally longitudinal of the web, each having exterior interlaced strands forming interstices and projections, the abutting ends of each ring meeting on a bias, pressing each such ring individually to compress it in a direction normal to its plane and to shape it with at least one overhanging edge, the resulting rings being so related in size and shape as to fit snugly in progression one within the other, assembling such shapes in such recited manner to form a composite disc, the abutting ends of successive rings being staggered angularly around the disc, compressing the thus assembled composite disc in a direction normal to its plane so that there results a unitary self-sustaining body, impregnating such body with a heat hardenable fluid bonding and friction-treatment material composed predominantly of a synthetic resin, coating the thus impregnated body with a mix comprising a major amount of short fibered asbestos and a minor amount of a fluid heat hardenable binder comprising a synthetic resin, allowing the thus coated body to dry, and curing the impregnating material and the binder in the coating by subjecting the body to heat while under pressure.

7. The method of forming a friction element comprising the following steps in the order named: forming a series of similar hollow shapes of one closed turn of rope-like webs, the shapes being so related in size as to fit in progression one within the other when similarly oriented, assembling such shapes in such recited manner to form a composite shape, compressing the thus assembled composite shape in a direction generally normal thereto so that there results a unitary self-sustaining body, impregnating such body with a heat hardenable bonding and friction-treatment material, coating the thus impregnated body with a mix comprising a comminuted filler and a heat hardenable binder, allowing the thus coated body to dry, and curing the impregnating material and the binder in the coating by subjecting the body to heat and pressure.

GEORGE BRAHS.

REFERENCES CITED

The following references are of record in the file of this patent:

UNITED STATES PATENTS

| Number | Name | Date |
| --- | --- | --- |
| 1,614,200 | Kattwinkel | Jan. 11, 1927 |
| 2,025,039 | Cannon | Dec. 24, 1935 |
| 2,025,052 | Hess | Dec. 24, 1935 |
| 2,149,324 | Wales | Mar. 7, 1939 |
| 2,196,569 | Stroehla et al. | Apr. 9, 1940 |
| 2,240,358 | Walters | Apr. 29, 1941 |